Sept. 11, 1962 A. E. UHLEEN 3,053,725

COATING OF SHEET MATERIAL

Filed May 13, 1958

INVENTOR.
ARTHUR E. UHLEEN

BY Shanley & O'Neil

ATTORNEYS

United States Patent Office
3,053,725
Patented Sept. 11, 1962

3,053,725
COATING OF SHEET MATERIAL
Arthur E. Uhleen, Allentown, Pa., assignor to National Steel Corporation, a corporation of Delaware
Filed May 13, 1958, Ser. No. 734,989
20 Claims. (Cl. 156—278)

Figure 1:
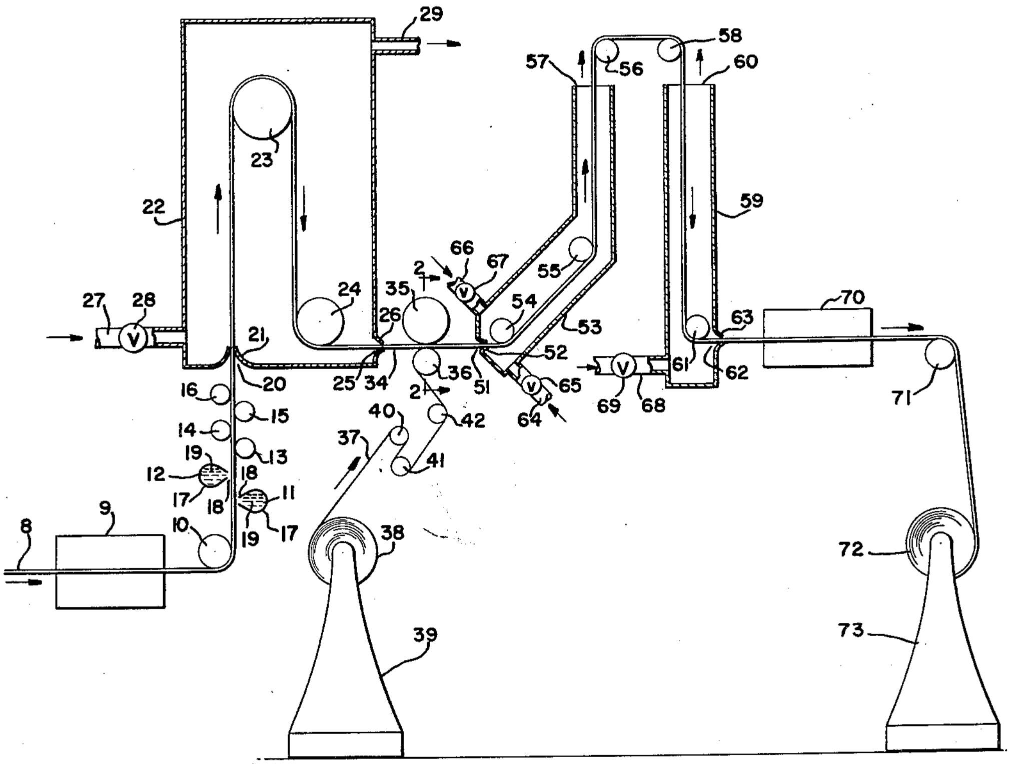

This invention relates to a novel method of applying organic film material to sheet material and, in one of its more specific embodiments, to a novel method of preventing shrinkage of the applied organic film away from the edges of the sheet material. The invention further relates to a novel method of applying a tightly adhering organic film to one side of metal sheet material and a hardened organic finish to the other side wherein shrinkage of the organic film away from the edges of the sheet material may be prevented.

Organic film material is generally applied to metal sheet material by coating the surface with a suitable adhesive dissolved in a solvent, heat-curing the coating of adhesive composition to drive off solvent and render the resulting thin film of adhesive soft and receptive with excellent bonding properties, and then applying the organic film to the hot metal surface having cured adhesive thereon under sufficient pressure to assure that the organic film is adhered to the metal surface. The resulting hot metal laminate, when following prior art practice, then is cooled to substantially room temperature over a relatively long period of time during which time the applied organic film tends to shrink away from the edges of the strip leaving the edges barren of organic film. The barren edges must be trimmed and discarded as waste. Inasmuch as the shrinkage is often as much as one inch on the edges of 32-inch metal sheet, this loss of material results in a substantial increase in the cost of manufacture.

Still other disadvantages are present when cooling the metal sheet having organic film applied thereon following prior art practice. For example, the bond produced between the organic film and metal strip, particularly along the edges of the strip, is relatively weak and the organic film tends to curl back from the edges during the cooling step and cause a further loss of product. In addition, the metal laminate and/or the organic film-metal strip bond is easily damaged during the cooling step by passage through the apparatus used in the laminating process, or other handling operations. As a result of the foregoing and other disadvantages and limitations, a suitable process for eliminating the disadvantages and limitations of the prior art processes has long been sought.

The above and other disadvantages and limitations of the prior art are eliminated by the present invention. In accordance with the present invention, at least the surface of the hot sheet material having organic film thereon is cooled rapidly to a temperature less than the flow temperature of the adhesive. The cooled surface of the sheet material is then maintained at this temperature during the cooling step while heat is being removed from the interior of the sheet material. Operating in accordance with this practice eliminates any substantial amount of shrinkage of the organic film from the edges of the metal, cooling of the organic film, and damage to the hot laminate during the cooling step, as well as many other disadvantages and limitations of the prior art.

It is an object of the present invention to provide a novel method and improved apparatus for applying organic film material to sheet material.

It is a further object of the present invention to provide a novel method and improved apparatus for applying organic film material and an organic finish to sheet material.

It is still a further object of the present invention to provide a novel method of applying a tightly adhering organic film and a hardened organic finish to metal sheet material wherein shrinkage of the applied organic film material from the edges of the metal sheet is prevented.

It is still a further object of the present invention to provide a novel method of applying a tightly adhering vinyl film and a hardened organic finish to metal sheet material such as ferrous metal strip wherein shrinkage of the applied vinyl film away from the edges of the strip is prevented.

It is still a further object of the present invention to provide a novel method of applying a tightly adhering organic film material and a hardened organic finish to metal sheet material wherein the coating of adhesive composition for the organic film may be heat-cured and the coating of organic finish composition may be heat-hardened during a single heating cycle in a zone maintained at a suitable elevated temperature, and wherein shrinkage of the applied organic film away from the edges of the metal sheet is prevented.

It is still a further object of the present invention to provide a novel and improved method of applying a tightly adhering vinyl film and a hardened organic finish to ferrous metal strip wherein the coating of adhesive composition for the vinyl film may be heat-cured and the coating of organic finish may be heat-hardened during a single heating cycle in a zone maintained at a suitable elevated temperature, and wherein shrinkage of the applied vinyl film away from the edges of the metal sheet is prevented.

It is still a further object of the present invention to provide an improved metal laminate product which is produced in accordance with the method of the invention.

Figure 2:
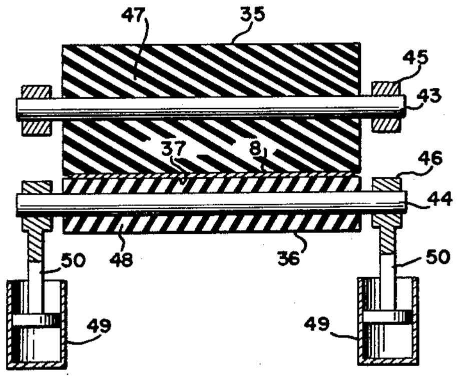

Still other objects and advantages of the present invention will be apparent to those skilled in the art upon reference to the following detailed description and the drawings, wherein:

FIGURE 1 is an elevational view diagrammatically illustrating suitable apparatus for use in practicing the present invention; and FIGURE 2 is an enlarged cross-sectional view taken along the line 2—2 of FIGURE 1.

Referring now to the drawings and more particularly to FIGURE 1, the ferrous metal strip 8 preferably has been given a suitable pre-treatment such as, for example, as disclosed in my copending application Serial No. 734,995, filed May 13, 1958, for "Method of Coating Sheet Material."

In general, any suitable pre-treatment may be used which results in a clean attractive metallic surface characterized by good corrosion resistance and good organic finish and adhesive bonding properties. Usually, such pre-treatments will comprise a suitable wet treatment for removal of foreign substances from the metal surface, followed by treatment in at least one solution containing phosphate and/or chromate to provide a passivated surface provided with a phosphate film and characterized by good corrosion resistance and improved organic finish and adhesive bonding characteristics. When the metal is ferrous metal, preferably the phosphate content of the phosphate-containing film resulting from the pre-treatment should be substantially below 200 mgs./100 sq. ft. and generally it should not exceed about 100 mgs./100 sq. ft. For best bonding properties with ferrous metal, usually the phosphate film should contain about 5–10 mgs. of phosphate/100 sq. ft. For metals other than ferrous metal, such a pre-treatment may differ somewhat for the pre-treatment described above for ferrous metal. For example, when the metal is aluminum, the pre-treatment may comprise treatment in an alkaline solution at 130–190° F. to remove foreign substances from the metal surface, followed by an aqueous rinse and treatment in a dilute aqueous solution containing phosphoric acid and chromic acid at a temperature of 130–190° F. to passivate the surface, improve bonding characteristics, and remove additional foreign substances from the metal surface. Also, where the metal to be pre-treated is galvanized ferrous metal, tinplate, etc., the metal may be given a pre-treatment to remove oils and other foreign substances from the metal surface, followed by treatment in an aqueous solution containing a small amount of chromic acid.

The pre-treated ferrous metal strip 8 is passed through unit 9 wherein the strip is heated within limits to be fully discussed hereinafter. The temperature-adjusted strip 8 is passed under roll 10 and upward past adhesive composition and organic finish composition applicators 11 and 12, leveling rolls 13 and 14, and metering rolls 15 and 16 to thereby provide one side of the strip 8 with a uniform coating of adhesive of a closely controlled desired thickness and the opposite side of the strip 8 with a uniform coating of organic finish which is likewise of a closely controlled desired thickness.

The applicators 11 and 12 preferably are of the type disclosed in United States Patent 2,784,697, issued March 12, 1957, to Arthur E. Uhleen; while a presently preferred construction for leveling rolls 13 and 14 and metering rolls 15 and 16 and method of applying a coating of the organic finish composition and adhesive composition are disclosed in application Serial No. 516,168, filed June 17, 1955, now Patent No. 2,961,336, on behalf of Arthur E. Uhleen and entitled "Method of Coating Strip Materials With Paints or Enamels." The applicators disclosed in United States Patent 2,784,697 are so designed as to be capable of depositing fluid coating materials by a modified flow-type process wherein pools of a fluid coating material of predetermined size are maintained in contact with opposite sides of metal strip 8. The applicators 11 and 12, which are located on opposite sides of the strip 8, each may comprise an elongated hollow body member 17 positioned transversely of the metal strip 8 and each may be provided with a longitudinal nozzle 18 disposed so as to discharge against one side of the metal strip 8 and across its width. The hollow body member 17 of each applicator is fed with its respective fluid coating material 19 under pressure by means not shown to insure uniform discharge of the fluid coating material, i.e., the adhesive composition or the organic finish composition, through the nozzle 18 and across the width of the metal strip 8. Preferably, the adhesive and organic finish compositions are substantially completely homogenized and heated to a temperature approaching but less than the temperature of their respective flash points. In addition, preferably the strip 8 is heated in unit 9 to a temperature closely approximating the lower flash point of the two compositions. The temperature of strip 8 and the adhesive and organic finish compositions at the point of their application thereto may vary over a considerable range within the above described limits, but usually the temperature should be about 150–200° F. and, preferably, about 160–165° F. The leveling rolls 13 and 14 are positioned above the applicators 11 and 12 on either side of the metal strip 8 and are adapted to contact the metal strip 8 and cause a lateral displacement of adhesive or organic finish composition in such a manner as to perform a "leveling" operation; while metering rolls 15 and 16 are adapted to contact the metal strip 8 after leveling rolls 13 and 14 and control the quantity of adhesive or organic finish composition remaining on the surfaces of the strip. The preferred thickness of the coating of adhesive composition may vary over a considerable range depending, at least in part, upon the nature of the specific adhesive composition used, the viscosity of the applied adhesive composition, the surface upon which it is applied and the nature of the organic film material to be applied to the metal surface. However, usually the coating of adhesive composition preferably should be approximately 0.0005–0.001 inch in thickness, while the thickness of the coating of organic finish may vary substantially for reasons similar to those mentioned above for the adhesive composition but usually it should be about 0.0001–0.001 inch in thickness for preferred results.

After receiving coatings of the adhesive and organic finish compositions, the ferrous metal strip 8 is passed upward through entrance 20 provided with strip sealing means including flaps 21 into oven 22, and through oven 22 via a path established by guide rolls 23 and 24. The strip 8 is then withdrawn via exit 25 provided with strip sealing means including flaps 26. While the strip 8 is shown as making only one pass in oven 22 for the purpose of simplifying the drawings, it is understood that it may make a plurality of passes to thereby increase the residence time within oven 22 at a given strip speed when it is so desired. The oven 22 may be heated by means of a hot gaseous heating medium supplied thereto via conduit 27 including control valve 28 at a controlled rate and temperature to maintain a desired temperature within oven 22, while cooled gaseous heating medium is withdrawn from oven 22 via conduit 29. The hot gaseous heating medium preferably is supplied to and withdrawn from oven 22 at a rate at least sufficient to dilute the solvent vapors flashed off therein while heat-curing the coating of adhesive composition and heat-hardening the coating of organic finish composition to thereby maintain a non-explosive atmosphere within oven 22.

While the ferrous metal strip 8 is within oven 22, the solvent content of the coating of adhesive composition, which preferably is applied by applicator 11, is flashed off and the resulting thin coating of adhesive is heated to a temperature sufficiently high and for a period of time so as to cause the adhesive to be soft and receptive to the flexible organic film to be described hereinafter at the time it is applied to the strip 8, and to assure a good adherent bond between the organic film and the metal strip. In addition, the metal strip 8 may be heated to a temperature sufficiently high to assure fusion of the organic film material thereto during its application under pressure and thus tightly adhere the organic film material to the metal strip, or aid therein. The coating of organic finish composition, which preferably is applied by applicator 12, must be sufficiently heat-hardened during the heat-curing or heat conditioning of the coating of adhesive composition and metal strip above described so as not be removed during application of the organic film to the metal strip, and yet not be overcured sufficiently to result in a brittle film of hardened organic finish on the final product.

Preferably, at least the roll 23 in oven 22 is of the type disclosed in application Serial No. 612,783, filed September 28, 1956, for "Transport Roller," on behalf of Arthur E. Uhleen, now abandoned. When using rollers in oven 22 of the type described in the above application, the freshly coated ferrous metal strip 8 does not contact the rolls 23 and 24 with the exception of a narrow edge portion along either side of the strip which engages annular raised shoulders on either end of the roll. This prevents contact of the strip with the roll other than on the edges of the strip and the accompanying marring of the freshly coated surfaces.

The ferrous metal strip 8 is withdrawn from oven 22 and passed between backup roll 35 and pressure roll 36. A flexible organic film material 37 in strip form, which may be of a width substantially that of strip 8 may be fed from coil 38 rotatably mounted on pedestal 39 between backup roll 35 and pressure roll 36 at a rate substantially corresponding to the speed of strip 8 and in such a manner so as to be applied to the heat-cured adhesive-coated side 34 of strip 8. Preferably, the organic film 37 to be applied is passed over leveling and tensioning rolls 40, 41, and 42 for the purpose of leveling the organic film, removing wrinkles therefrom, and providing slight tension therein so as to assure uniform application.

Referring now to FIGURE 2, which is a detailed diagrammatic view taken along the line 2—2 of FIGURE 1, the metal shafts 43 and 44 of backup roll 35 and pressure roll 36 are rotatably mounted on mounting means including bearings 46 and 46, respectively. The rolls 35 and 36 are provided with rubber coverings 47 and 48, respectively. Hydraulic cylinder assemblies 49 including pistons 50 are arranged at either end of shaft 44 and adapted to urge pressure roll 36 in a direction toward backup roll 35, and thus apply a predetermined pressure on the metal strip 8 and organic film 37 as they pass between rolls 35 and 36. The amount of pressure to be applied may vary depending upon the nature of the organic film material, but, in general, the amount of pressure applied should be sufficient to cause the organic film 37 to be uniformly adhered or fused to the heat-cured adhesive coated surface of strip 8. However, the pressure should not be sufficiently high to cause embossing on the organic film 37 to be washed out or the organic film itself reduced below a desired thickness. The rolls 35 and 36 may apply a pressure of about 40–100 p.s.i. on the strip 8 and organic film but a pressure of about 75–85 p.s.i. is usually preferred.

After application of organic film material 37 to strip 8, the coated hot strip 8 is passed through entrance 51 provided with strip sealing means including flaps 52 into first cooling duct 53, and then through first cooling duct 53 via a path defined by rolls 54, 55 and 56. The strip 8 is withdrawn from first cooling duct 53 in a strip exit 57, passed over guide rolls 56 and 58 and through second cooling duct 59 via strip entrance 60 and guide roll 61 and strip exit 62 provided with strip sealing means including flaps 63. While within cooling ducts 53 and 59, the hot strip 8 is cooled very rapidly to about room temperature or below. This is accomplished by supplying a large volume of a refrigerated gaseous cooling medium such as refrigerated air at about 32° F. to first cooling duct 53 via conduit 64 including control valve 65 and conduit 66 including control valve 67, and to second cooling duct 59 via conduit 68 including control valve 69. The refrigerated air passes upward through cooling ducts 53 and 59 at high velocity thereby very rapidly cooling at least the surface of strip 8, and the resulting warmed air is withdrawn via strip exit 57 and strip entrance 60, respectively. The cooled strip 8 withdrawn via strip exit 62 is passed to slitter 70 where the edges of the strip 8 are trimmed and, if desired, the strip 8 may be cut into a plurality of widths. The strip 8 then passes over guide roll 71 and onto coil 72 which is rotatably mounted on pedestal 73.

In accordance with the present invention, it is essential that at least the surface of the hot strip 8 which is covered with organic film be rapidly cooled and maintained at a temperature below the flow temperature of the adhesive very shortly after passing through rolls 35 and 36 and application of the organic film 37. Otherwise, the freshly applied organic film will tend to shrink back from the side edges of strip 8 and result in loss of product. For example, with 32-inch strip, the shrinkage from the side edges is often as much as 1 inch and this material must be trimmed from the strip 8 and discarded. Preferably, the surface of the strip is "shock-cooled" to about 10° F. below room temperature and at least the surface covered with organic film is maintained at this temperature, or at a temperature substantially below the flow temperature of the adhesive, while the interior of the strip is being cooled to about 10° F. below room temperature.

It has been discovered that the above described "shock-cooling" of metal strip may be most conveniently accomplished by passing the hot strip through a cooling duct of relatively small cross-sectional area and supplying large quantities of refrigerated gaseous cooling medium thereto at high velocity. For example, when cooling 32 inch strip down to about room temperature from a temperature of about 400° F., about 10,000–14,000 c.f.m. of air at 32° F. should be supplied to the strip at a strip speed of about 60 feet/min. and a strip thickness of about 0.020. The linear speed of the refrigerated air in the cooling duct preferably is about 1400–1800 feet/min.

In addition to preventing shrinkage of the organic film from the side edges of the strip, the method of the present invention also produces other unexpected results. For example, it has been found that the bond between the organic film and metal along the edges of the strip improved markedly, and that the film was tightly adhered to the metal even at the edges of the strip. When operating in accordance with prior art practice, the organic film often curls back from the edges and damages the product. In addition, over-all adhesion of the organic film and finish to the strip surface is greatly improved and the strip may be handled in the apparatus without damage either to the organic finish or the organic film during or after the cooling step.

The flexible organic film 37 which may be applied to a heat resistant substrate in accordance with the invention may be any of a large number of suitable materials such as thermoplastic "vinyl" resin film, including vinyl chloride film as well as vinyl chloride film modified with other ingredients, such as by copolymerizing therewith vinylidene chloride or vinyl acetate, or vinyl chloride polymers modified with added material such as acrylonitrile-butadiene polymers. The vinyl film may be plasticized, and/or it may contain suitable pigments, fillers, etc., or little or none of these substances may be present. Films of methyl methacrylate polymers, cellulose acetate or cellulose nitrate fabric-backed films, or synthetic rubber-based materials, preferably in strip form, also may be used. The term "film" as used in the specification and claims is intended to include suitable flexible materials in sheet form which may be referred to in the art as "sheet," as well as materials referred to as "film." These materials are generally classified in accordance with their thicknesses, with sheet materials usually being defined as materials having a thickness of 0.008 inch or greater, and with film being defined as materials having a thickness less than 0.008 inch. In general, films as thin as 0.004 inch may be deposited satisfactorily in accordance with the invention, and films many times as thick may be used, if desired. Preferably, the film should have a thickness of about 0.004–0.020 inch and it may be embossed or plain. The preferred organic film material is vinyl film. Vinyl films having a thickness of about 0.008 inch have been found to give excellent results.

The preferred adhesive composition to be used in the present invention will vary somewhat with the nature and composition of the organic film material. Generally, the adhesive composition may be a heat-curable adhesive composition including suitable thermoplastic resins, thermosetting or "heat-conditionable" resins, which are useful as adhesives and, preferably, such resins should be relatively high temperature materials. A large number of suitable adhesive compositions are known to the art and usually specific adhesives are preferred for a given type of organic film material. For example a number of very satisfactory adhesive compositions for vinyl film are disclosed in United States Patent 2,329,456, issued September 14, 1943, to William E. Campbell, Jr. The specific adhesive composition selected should have a heat-curing cycle with the temperature of heating and the period of heating during the cycle being such as to flash off solvent and render the resulting film of adhesive soft and pliable with good adhesive properties, and with the temperature and period of heating during the cycle being such as to allow the organic finish to heat-harden without the organic finish being overcured. In addition, the heat-curing cycle and/or the adhesive properties should be such as to allow sufficient time for the metal strip to reach a preferred temperature without overcuring the adhesive which often is a temperature slightly below the temperature at which embossing is washed out when a thermoplastic film is being applied. With heavier metal substrates, the required period of heating at a given temperature to reach a desired metal temperature is greater than with thinner metal substrates.

The organic finish selected will depend at least to some extent upon the heat-curing cycle for the particular adhesive composition selected since the coating of organic finish composition must be cured at the time when the strip 8 is passed between rolls 35 and 36 and the organic film applied thereto. Otherwise, the coating of organic finish will be marred or completely removed. In addition, the organic finish selected preferably should not overcure during the heat-curing cycle for the coating of adhesive composition and heat conditioning strip 8 since it would then be brittle and have unsatisfactory forming characteristics. Preferably, the particular heat-hardenable industrial paint, lacquer, varnish, enamel, or other suitable industrial finish selected should be formulated to have a heat-hardening cycle closely approximating the heat-curing cycle for the adhesive composition selected. The heat-hardening cycle of organic finishes may be varied or controlled to a large extent by formulations and methods well known in the art and, in addition, further steps may be taken to reduce the heat-hardening cycle by pre-heating the metal strip 8, reducing solvent content, etc., such as herein practiced.

When vinyl film is being applied to ferrous metal sheet material having a thickness of about 0.10–0.04 inch, the oven 22 may be maintained at a temperature of about 400–650° F. with the residence time of the strip within the oven 22 being about 30 seconds to 2 minutes. Usually, it is preferred to operate at an oven temperature of about 500–525° F. and with a strip residence time within the oven of about 40–50 seconds. The strip temperature at the time of applying the vinyl film is of importance, and the strip temperature at the completion of heat-curing the adhesive composition and at the time of application of the vinyl film should be about 300–450° F. for satisfactory results. Best results are usually obtained at a strip temperature of about 375–425° F. at the time the vinyl film is applied. The vinyl film is applied to the strip surface having cured adhesive thereon, i.e., the adhesive is in a proper condition following the above discussed heat-curing cycle to receive and tightly adhere the organic film to the strip at a suitable strip temperature as above defined, and subjected to pressure. A satisfactory pressure is about 40–100 p.s.i., but a pressure of about 75–80 p.s.i. is usually preferred.

Specific examples of suitable organic films, adhesives and organic finish compositions which may be used are as follows.

TABLE I

*Organic Film Material*

| Ingredient: | Parts by weight |
|---|---|
| (A) | |
| Polyvinyl chloride (35,000 avg. mol. wt.) | 100 |
| Tricresyl phosphate | 15 |
| Dioctyl phthalate | 15 |
| Lead stearate | 1.5 |
| High molecular weight alcohol wax | 1.5 |
| Lead silicate | 5.0 |
| Lead phosphite | 1.5 |
| Stearic acid | 0.25 |
| Pigment | 5.0 |
| (B) | |
| Polyvinyl chloride | 100 |
| Polyvinyl alcohol | 2 |
| Carnauba wax | 4 |
| Dibasic lead phosphite | 0.5 |
| Tribasic lead sulfate | 20 |
| Pigment | 10 |

TABLE II

*Adhesive Compositions*

| Ingredient: | Parts by weight |
|---|---|
| (A) | |
| Polyvinyl acetate-chloride copolymer having the composition 12% polyvinyl acetate, 87% polyvinyl chloride and 1% maleic anhydride and a molecular weight of 1,000–15,000 | 11.3 |
| Polybutyl methacrylate | 13.1 |
| Polyisobutyl methacrylate | 5.6 |
| Butyl acetate | 21 |
| Methyl isobutyl ketone | 21 |
| Toluol | 14 |
| Propylene oxide | 3.5 |
| Ethyl acetate | 13.65 |
| (B) | |
| Polyvinyl chloride-acetate (87/12) copolymer modified with 1% maleic anhydride | 10 |
| Acrylonitrile-butadiene rubbery copolymer (35/65) | 10 |
| Methyl ethyl ketone | 60 |
| Methyl isobutyl ketone | 20 |
| | 100 |

TABLE III

*Organic Finish Compositions*

| Ingredient: | Parts by weight |
|---|---|
| (A) | |
| Titanium dioxide | 300 |
| Dehydrated castor oil alkyd resin | 450 |
| Melamine resin 50/50 | 150 |
| Xylol | 100 |
| Viscosity (Ford #4 cup at 80° F.)_seconds | 110 |
| (B) | |
| Titanium dioxide | 950 |
| Zinc oxide | 50 |
| Alkyd resin (#1) | 820 |
| Urea-formaldehyde resin (#4) | 820 |
| Xylol | 820 |
| Butanol | 546 |
| Petroleum naphtha (high solvency #40) | 1029 |
| Non-volatile content _percent | 52.8 |
| Viscosity (#4 Ford cup at 80° F.)_seconds | 22 |
| Pigment/binder ratio (by weight) | 1/1.64 |

The product of the present invention is capable of being subjected to strenuous after-forming operations without damage to either the hardened organic finish or the tightly adhering organic film material. For example, the product of the present invention is capable of making a 180° seam or a "Pittsburgh lock" seam without damage. Thus, the process of the present invention is capable of producing a superior product and much more economically than heretofore possible.

While ferrous metal strip has been referred to in the foregoing specific description, it is expressly understood that other metals may be used such as aluminum, tinplate, zinc coated ferous metal, etc. The foregoing materials may be in the form of flexible sheet or strip and of any suitable thickness. However, a thickness of about 0.010–0.040 inch is usually preferred. In addition, still other satisfactory heat resistant substances may be used.

It is expressly understood that the accompanying illustrative drawing, the foregoing detailed description and the following specific example are for purposes of illustration only, and are not intended as limiting to the spirit or scope of the appended claim.

EXAMPLE I

Ferrous metal strip having a thickness of 0.020 inch was pretreated at 160° F. for 15 seconds with scrubbing in a sodium orthosilicate solution to remove foreign materials from the surface, followed by a water rinse and treatment at 160° F. for 15 seconds with scrubbing in a 2% phosphoric acid solution containing a detergent. The strip was then rinsed with water, treated for 15 seconds at 160° F. in a solution containing 4 ounces of phosphoric acid and chromic acid for each 500 gallons of solution, and dried at 160° F. to remove moisture from the strip surface.

The pre-treated strip was heated to 165° F. and a 0.0007 inch coating of the adhesive composition "A" of Table II and a 0.0005 inch coating of the organic finish "A" of Table III were applied. The thus coated strip was heated in an oven maintained at a temperature of about 500–520° F. for a period of about 40–45° seconds to heat-cure the coating of adhesive and heat-harden the coating of organic finish. The strip was at a temperature of about 385–400° F. at the end of the heat treatment. A 0.0008 inch vinyl film of composition "A" of Table I was applied immediately to the surface area of the strip having cured adhesive thereon under a pressure of 80–85 p.s.i. to tightly adhere the vinyl film to the strip. The resulting laminate was then substantially immediately subjected to stream of refrigerated air at 32° F. and at a linear velocity of 1600 ft./min. to shock-cool the surface of the strip having organic film thereon to a temperature about 10° F. below room temperature. This temperature was maintained throughout the cooling cycle during the period heat was being removed from the interior of the strip and the interior of the strip cooled to about room temperature. The organic film did not shrink from the side edges and the bond between the organic film and the strip was outstanding at all points.

The resultant product was subjected to strenuous forming operations without damage to either the hardened organic finish or the tightly adhering organic film.

While the above method of cooling the hot metal laminate has been found to be very satisfactory, other methods which do not result in rapid cooling have not. For example, the use of air at room temperature as a gaseous cooling medium will not give satisfactory results.

I claim:

1. A method of applying organic film material to heat resistant sheet material having a heat-activatable adhesive composition for organic film material thereon comprising activating the adhesive by heating the sheet material to an elevated temperature not less than the flow temperature of the adhesive, applying organic film material on a surface of the sheet material having activated adhesive thereon while the sheet material is at an elevated temperature not less than the flow temperature of the adhesive and under pressure to adhere the organic film material to the sheet material, and cooling the resultant sheet material below the flow temperature of the adhesive, the adhesive having a flow temperature above normal room temperature and the applied organic film material tending to shrink from the edges of the heat resistant sheet material when the resultant sheet material is cooled at normal room temperature, the resultant sheet material being cooled and shrinkage of the organic film material from the edges of the heat resistant sheet material being reduced by contacting it with a cooling fluid having a temperature below normal room temperature whereby at least the surface of the sheet material having organic film thereon and the adhesive are cooled to a temperature below the flow temperature of the adhesive over at least a major portion of the period the interior of the sheet material is being cooled to a temperature below the flow temperature of the adhesive.

2. A method of applying organic film material to metal sheet material having a heat-activatable adhesive composition for organic film material thereon comprising activating the adhesive by heating the metal sheet material to an elevated temperature not less than the flow temperature of the adhesive, applying organic film material on a surface of the metal sheet material having activated adhesive thereon while the sheet material is at an elevated temperature not less than the flow temperature of the adhesive and under pressure to adhere the organic film material to the metal sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by contacting it with a cooling fluid having a temperature below normal room temperature whereby at least the surface of the metal sheet material having organic film thereon and the adhesive are cooled to a temperature below the flow temperature of the adhesive over at least a major portion of the period the interior of the metal sheet material is being cooled to a temperature below the flow temperature of the adhesive.

3. A method of applying organic film material to metal sheet material comprising applying a coating of heat-curable adhesive composition for organic film material on a surface of the metal sheet material, the adhesive composition being curable at a temperature of about 400–650° F., curing the coating of adhesive by heating the metal sheet material in a zone maintained at a temperature of about 400–650° F., applying organic film material on a surface of the metal sheet material having cured adhesive thereon while the sheet material is at an elevated temperature not less than the flow temperature of the adhesive and under pressure to adhere the organic film material to the metal sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by contacting it with a cooling fluid having a temperature below normal room temperature whereby at least the surface of the metal sheet material having organic film thereon and the adhesive are cooled to a temperature below the flow temperature of the adhesive over at least a major portion of the period the interior of the metal sheet material is being cooled to a temperature below the flow temperature of the adhesive.

4. A method of applying organic film material to metal sheet material comprising applying a coating of heat-curable adhesive composition for organic film material on a surface of metal sheet material, the coating of adhesive being heat-curable when heated in a zone maintained at a temperature of about 400–650° F. over a period of about 30 seconds to 2 minutes, curing the coating of adhesive by heating the metal sheet material in a zone maintained at a temperature of about 400–650° F. for a period of about 30 seconds to 2 minutes, applying organic film material on a surface of the metal sheet material having cured adhesive thereon while the sheet material is at an elevated temperature not less than the flow temperature of the adhesive and under pressure to adhere the organic film material to the metal sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by contacting it with a cooling fluid having a temperature below normal room temperature whereby at least the surface of the metal sheet material having organic film thereon and the adhesive are cooled to a temperature below the flow temperature of the adhesive over at least a major portion of the period the interior of the metal sheet material is being cooled to a temperature below the flow temperature of the adhesive.

5. A method of applying organic film material to metal sheet material comprising applying a coating of heat-curable adhesive composition for organic film material on a surface of metal sheet material, the adhesive composition being heat-curable when the metal sheet material is heated to a temperature of about 300–450° F. to cure the coating of adhesive, applying organic film material on a surface of the metal sheet material having cured adhesive thereon while the sheet material is at a temperature of about 300–450° F. and under pressure to adhere the organic film material to the metal sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by contacting it with a cooling fluid having a temperature below normal room temperature whereby at least the surface of the metal sheet material having organic film thereon and the adhesive are cooled to a temperature below the flow temperature of the adhesive over at least a major portion of the period the interior of the metal sheet material is being cooled to a temperature below the flow temperature of the adhesive.

6. A method of applying vinyl film to ferrous metal strip comprising depositing a light phosphate-containing film on the surface of the ferrous metal stirp having a phosphate content of about 3–100 mg./100 sq. ft., applying a coating of heat-curable adhesive composition for vinyl film on a surface of the ferrous metal strip, the ferrous metal strip having a thickness of about 0.010–0.040 inch and the coating of adhesive material having a thickness of 0.0005–0.001 inch, the coating of adhesive material being heat-curable when the ferrous metal strip is heated to a temperature of about 300–450° F., curing the coating of adhesive by passing the ferrous metal strip into a heating zone and heating the strip to a temperature of about 300–450° F., applying vinyl film having a thickness of about 0.004–0.020 inch on a surface of the ferrous metal strip having cured adhesive thereon while the ferrous metal strip is at a temperature of about 300–450° F. and under pressure to adhere the vinyl film to the ferrous metal strip, and cooling the resultant ferrous metal strip below the flow temperature of the adhesive, the adhesive having a flow temperature above normal room temperature and the applied vinyl film tending to shrink from the edges of the ferrous metal strip when the resultant ferrous metal strip is cooled at normal room temperature, the resultant ferrous metal strip being cooled and shrinkage of the vinyl film from the edges of the ferrous metal strip being reduced by contacting it with a cooling fluid having a temperature below normal room temperature whereby at least the surface of the ferrous metal strip having vinyl film thereon and the adhesive are cooled to a temperature below the flow temperature of the adhesive over at least a major portion of the period the interior of the ferrous metal strip is being cooled to a temperature below the flow temperature of the adhesive.

7. A method of applying organic film material to metal sheet material comprising applying a coating of heat-curable adhesive composition for organic film material on a surface of the metal sheet material, the coating of adhesive composition being heat-curable when the metal sheet material is heated to a temperature of about 375–425° F., curing the coating of adhesive material by heating the metal sheet material to a temperature of about 375–425° F., applying organic film material on a surface of the metal sheet material having cured adhesive thereon while the sheet material is at a temperature of about 375–425° F. and under pressure to adhere the organic film to the metal sheet material, and cooling the resultant material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by contacting it with a cooling fluid having a temperature below normal room temperature whereby at least the surface of the metal sheet material having organic film thereon and the adhesive are cooled to a temperature below the flow temperature of the adhesive over at least a major portion of the period the interior of the metal sheet material is being cooled to a temperature below the flow temperature of the adhesive.

8. A method of applying vinyl film to ferrous metal strip comprising passing ferrous metal strip through a solution containing a substance yielding phosphate ion to deposite a phosphate film on the ferrous metal surface, the deposited phosphate film having a phosphate content of about 5–10 mgs. of phosphate per 100 sq. ft. of ferrous metal surface, applying a coating of heat-curable adhesive composition for vinyl film on a surface of the ferrous metal strip, the metal strip having a thickness of 0.010–0.040 inch and the coating of adhesive composition having a thickness of 0.0005–0.001 inch, the coating of adhesive composition being heat-curable when the ferrous metal strip is heated to a temperature of about 375–425° F., curing the coating of adhesive composition by heating the ferrous metal strip to a temperature of about 375–425° F., applying vinyl film having a thickness of about 0.004–0.020 inch on a surface of the ferrous metal strip having cured adhesive thereon while the ferrous metal strip is at a temperature of about 375–425° F. and under pressure to adhere the vinyl film to the ferrous metal strip, the pressure being about 40–100 lbs. per sq. inch, and cooling the resultant ferrous metal strip below the flow temperature of the adhesive, the adhesive having a flow temperature above normal room temperature and the applied vinyl film tending to shrink from the edges of the ferrous metal strip when the resultant ferrous metal strip is cooled at normal room temperature, the resultant ferrous metal strip being cooled and shrinkage of the vinyl film from the edges of the ferrous metal strip being reduced by contacting it with a cooling fluid having a temperature below normal room temperature whereby at least the surface of the ferrous metal strip having vinyl film thereon and the adhesive are cooled to a temperature below the flow temperature of the adhesive over at least a major portion of the period the interior of the ferrous metal strip is being cooled to a temperature below the flow temperature of the adhesive.

9. A method of applying a tightly adhering organic film material and a hardened organic finish to heat resistant sheet material comprising applying a heat-curable adhesive composition for the organic film material on a first surface area of the sheet material, applying a heat-hardenable organic finish composition on a second surface area of the sheet material, the compositions of the organic finish and the adhesive being such that the organic finish hardens during a heat-curing cycle for the adhesive composition, curing the adhesive and hardening the organic finish by heating the sheet material to an elevated temperature, applying organic film material on at least a portion of the surface area of the sheet material having cured adhesive thereon while the sheet material is at an elevated temperature not less than the flow temperature of the adhesive and under pressure to adhere the organic film material to the sheet material, and cooling the resultant sheet material below the flow temperature of the adhesive, the adhesive having a flow temperature above normal room temperature and the applied organic film material tending to shrink from the edges of the heat resistant sheet material when the resultant sheet material is cooled at normal room temperature, the resultant sheet material being cooled and shrinkage of the organic film material from the edges of the heat resistant sheet material being reduced by passing a cooling fluid thereover having a temperature below normal room temperature whereby at least the surface of the sheet material having organic film thereon and the adhesive are cooled to a temperature below the flow temperature of the adhesive over at least a major portion of the period the interior of the sheet material is being cooled to a temperature below the flow temperature of the adhesive.

10. A method of applying a tightly adhering organic film material and a hardenable organic finish to metal sheet material comprising applying a heat-curable adhesive composition for the organic film material on a first surface area of the metal sheet material, applying a heat-hardenable organic finish composition on a second surface area of the metal sheet material, the compositions of the organic finish and the adhesive being such that the organic finish hardens during a heat-curing cycle for the adhesive composition, curing the adhesive and hardening the organic finish by heating the metal sheet material to an elevated temperature, applying the organic film material on at least a portion of the surface area of the metal sheet material having cured adhesive thereon while the sheet material is at an elevated temperature not less than the flow temperature of the adhesive and under pressure to adhere the organic film material to the metal sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by passing a cooling fluid thereover having a temperature below normal room temperature whereby at least the surface of the metal sheet material having organic film thereon and the adhesive are cooled to a temperature below the flow temperature of the adhesive over at least a major portion of the period the interior of the metal sheet material is being cooled to a temperature below the flow temperature of the adhesive.

11. A method of applying a tightly adhering organic film material and a hardenable organic finish to metal sheet material comprising applying a heat-curable adhesive composition for the organic film material on a first surface area of the metal sheet material, applying a heat-hardenable organic finish composition on a second surface area of the metal sheet material, the compositions of the organic finish and the adhesive being such that the organic finish hardens during a heat-curing cycle for the adhesive composition upon heating at a temperature of about 400–650° F., curing the adhesive and hardening the organic finish by heating the metal sheet material in a zone maintained at a temperature of about 400–650° F., applying the organic film material on at least a portion of the surface area of the metal sheet material having cured adhesive thereon while the sheet material is at an elevated temperature not less than the flow temperature of the adhesive and under pressure to adhere the organic film material to the sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by passing a cooling fluid thereover having a temperature below normal room temperature whereby at least the surface of the metal sheet material having organic film thereon and the adhesive are cooled to a temperature below the flow temperature of the adhesive over substantially the entire period the interior of the metal sheet material is being cooled to a temperature below the flow temperature of the adhesive.

12. A method of applying a tightly adhering organic film material and a hardenable organic finish to metal sheet material comprising applying a coating of heat-curable adhesive composition for the organic film material on a first surface area of the metal sheet material, applying a heat-hardenable organic finish composition on a second surface area of the metal sheet material, the compositions of the organic finish and the adhesive being such that the organic finish hardens during a heat-curing cycle for the coating of the adhesive composition, the coating of adhesive composition being heat-curable when heated for a period of about 30 seconds to 2 minutes in a zone maintained at a temperature of about 400–650° F., curing the adhesive and hardening the organic finish by heating the metal sheet material for a period of about 30 seconds to 2 minutes in a zone maintained at a temperature of about 400–650° F., applying the organic film material on at least a portion of the surface area of the metal sheet material having cured adhesive thereon while the sheet material is at an elevated temperature not less than the flow temperature of the adhesive and under pressure to adhere the organic film material to the metal sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by passing a cooling fluid thereover having a temperature below normal room temperature whereby at least the surface of the metal sheet material having organic film thereon and the adhesive are cooled to a temperature below the flow temperature of the adhesive over substantially the entire period the interior of the metal sheet material is being cooled to a temperature below the flow temperature of the adhesive.

13. A method of applying a tightly adhering organic film material and a hardenable organic finish to metal sheet material comprising applying a coating of heat-curable adhesive composition for the organic film material on a first surface area of the metal sheet material, applying a coating of heat-hardenable organic finish composition on a second surface area of the metal sheet material, the coating of adhesive composition being heat-curable when the metal sheet material is heated to a temperature of about 300–450° F., the compositions of the organic finish and the adhesive being such that the organic finish hardens during a heat-curing cycle for the coating of adhesive composition, curing the coating of adhesive composition and hardening the coating or organic finish by heating the metal sheet material to a temperature of about 300–450° F., applying the organic film material on at least a portion of the surface area of the metal sheet material having cured adhesive thereon while the temperature of the metal sheet is about 300–450° F. and under pressure to adhere the organic film material to the metal sheet material, and cooling the resultant sheet material below the flow temperature of the adhesive, the adhesive having a flow temperature above normal room temperature and the applied organic film material tending to shrink from the edges of the metal sheet material when the resultant sheet material is cooled at normal room temperature, the resultant sheet material being cooled and shrinkage of the organic film material from the edges of the metal sheet material being reduced by passing a cooling fluid thereover having a temperature below normal room temperature whereby at least the surface of the metal sheet material having organic film thereon and the adhesive are cooled to a temperature below the flow temperature of the adhesive over substantially the entire period the interior of the metal sheet material is being cooled to a temperature below the flow temperature of the adhesive.

14. A method of applying a tightly adhering organic film material and a hardened organic finish to ferrous metal sheet material comprising applying a phosphate film having a thickness of about 3–100 mgs./100 sq. ft. on the ferrous metal sheet material, applying a coating of heat-curable adhesive composition for the organic film material on a first surface area of the ferrous metal sheet material, the ferrous metal sheet material having a thickness of about 0.010–0.040 inch and the applied coating of adhesive material having a thickness of about 0.0005–0.001 inch, applying a coating of heat-hardenable organic finish composition on a second surface area of the ferrous metal sheet material, the coating of adhesive composition being heat-curable when the ferrous metal sheet material is heated to a temperature of about 300–450° F., the compositions of the organic finish and the adhesive being such that the coating of heat-hardenable organic finish hardens during a heat-curing cycle for the adhesive composition, curing the coating of adhesive and hardening the coating of organic finish by heating the ferrous metal sheet material to a temperature of about 300–450° F., applying organic film material having a thickness of about 0.004–0.020 inch on at least a portion of the surface area of the ferrous metal sheet material having cured adhesive thereon while at a temperature of about 300–450° F. and under pressure to adhere the organic film material to the sheet material, and cooling the resultant ferrous metal sheet material below the flow temperature of the adhesive, the adhesive having a flow temperature above normal room temperature and the applied organic film material tending to shrink from the edges of the ferrous metal sheet material when the resultant ferrous metal sheet material is cooled at normal room temperature, the resultant ferrous metal sheet material being cooled and shrinkage of the organic film material from the edges of the ferrous metal sheet material being reduced by passing a cooling fluid thereover having a temperature below normal room temperature whereby at least the surface of the ferrous metal sheet material having organic film thereon and the adhesive are cooled to a temperature below the flow temperature of the adhesive over substantially the entire period the interior of the ferrous metal sheet material is being cooled to a temperature below the flow temperature of the adhesive.

15. A method of applying a tightly adhering organic film material and a hardened organic finish to metal sheet material comprising applying a coating of heat-curable adhesive composition for the organic film material on a first surface area of the metal sheet material, applying a coating of heat-hardenable organic finish composition on a second surface area of the metal sheet material, the adhesive composition being heat-curable when the metal sheet material is heated to a temperature of about 375–425° F., the compositions of the organic finish and the adhesive being such that the organic finish hardens during a heat-curing cycle for the adhesive composition, curing the adhesive and hardening the organic finish by heating the metal sheet material to a temperature of about 375–425° F., applying organic film material on at least a portion of the surface area of the metal sheet material having cured adhesive thereon while the metal sheet material is at a temperature of about 375–425° F. and under pressure to adhere the organic film material to the metal sheet material, and cooling the resultant metal sheet material below the flow temperature of the adhesive, the adhesive having a flow temperature above normal room temperature and the applied organic film material tending to shrink from the edges of the metal sheet material when the resultant metal sheet material is cooled at normal room temperature, the resultant metal sheet material being cooled and shrinkage of the organic film material from the edges of the metal sheet material being reduced by passing a cooling fluid thereover having a temperature below normal room temperature whereby at least the surface of the metal sheet material having organic film thereon and the adhesive are cooled to a temperature below the flow temperature of the adhesive over substantially the entire period the interior of the metal sheet material is being cooled to a temperature below the flow temperature of the adhesive.

16. A method of applying a tightly adhering organic film material and a hardened organic finish to ferrous metal strip material comprising passing the ferrous metal strip through at least one solution containing a source of phosphate ion to deposit a phosphate film thereon having a phosphate content of about 5–10 mgs./100 sq. ft., applying a coating of heat-curable adhesive composition for the organic film material on a first surface area of the ferrous metal strip, the ferrous metal strip having a thickness of about 0.01–0.04 inch and the coating of adhesive composition having a thickness of about 0.0005–0.001 inch, applying a heat-hardenable organic finish composition on a second surface area of the ferrous metal strip, the coating of adhesive composition being heat-curable when the ferrous metal strip is heated to a temperature of about 375–425° F., the compositions of the organic finish and the adhesive being such that the coating of organic finish hardens during a heat-curing cycle for the coating of adhesive composition, curing the adhesive and hardening the organic finish by passing the ferrous metal strip into a zone maintained at an elevated temperature and heating the ferrous metal strip to a temperature of about 375–425° F., applying organic film material having a thickness of about 0.004–0.020 inch on at least a portion of the surface area of the ferrous metal strip having cured adhesive thereon while the strip is at a temperature of about 375–425° F. and with pressure to adhere the organic film material to the ferrous metal strip, the pressure being about 40–100 p.s.i., and cooling the resultant ferrous metal strip below the flow temperature of the adhesive, the adhesive having a flow temperature above normal room temperature and the applied organic film material tending to shrink from the edges of the ferrous metal strip when the resultant ferrous metal strip is cooled at normal room temperature, the resultant ferrous metal strip being cooled and shrinkage of organic film material from the edges of the ferrous metal strip being reduced by passing a cooling fluid thereover having a temperature below normal room temperature whereby at least the surface of the ferrous metal strip having organic film thereon and the adhesive are cooled to a temperature below the flow temperature of the adhesive over substantially the entire period the interior of the ferrous metal strip is being cooled to a temperature below the flow temperature of the adhesive.

17. In a method of applying organic film material to heat-resistant sheet material including the steps of applying under pressure the organic film material to a surface of the sheet material having cured adhesive thereon at an elevated temperature not less than the flow temperature of the adhesive and less than the temperature at which melting of the film occurs and thereafter cooling the assembly, the adhesive having a flow temperature above normal room temperature and the applied organic film material tending to shrink from the edges of the heat resistant sheet material when the assembly is cooled at normal room temperature, the improvement which comprises cooling at least the surface of the sheet material having organic film thereon and the adhesive to a temperature below the flow temperature of the adhesive over at least a major proportion of the period the interior of the sheet material is being cooled to a temperature below the flow temperature, the assembly being cooled and shrinkage of the organic film material from the edges of the heat resistant sheet material being reduced by contacting it with a cooling fluid having a temperature below normal room temperature.

18. In a method of applying organic film material to heat-resistant sheet material including the steps of applying under pressure the organic film material to a surface of the sheet material having cured adhesive thereon at an elevated temperature not less than the flow temperature of the adhesive and less than the temperature at which melting of the film occurs and thereafter cooling the assembly, the adhesive having a flow temperature above normal room temperature and the applied organic film material tending to shrink from the edges of the heat resistant sheet material when the assembly is cooled at normal room temperature, the improvement which comprises cooling at least the surface of the sheet material having organic film thereon and the adhesive to a temperature below the flow temperature of the adhesive over at least a major proportion of the period the interior of the sheet material is being cooled to a temperature below the flow temperature of the adhesive material, the assembly being cooled and shrinkage of the organic film material from the edges of the heat resistant sheet material being reduced by passing a high velocity stream of refrigerated air having a temperature below normal room temperature over at least the surface having organic film material thereon.

19. In a method of applying vinyl film material to heat-resistant sheet material including the steps of applying under pressure the vinyl film material to a surface of the sheet material having cured adhesive thereon at an elevated temperature above the flow temperature of the adhesive and less than the temperature at which melting of the film occurs and thereafter cooling the assembly, the adhesive having a flow temperature above normal room temperature and the applied vinyl film material tending to shrink from the edges of the heat resistant sheet material when the assembly is cooled at normal room temperature, the improvement which comprises cooling at least the surface of the sheet material having vinyl film thereon and the adhesive to a temperature below the flow temperature of the adhesive over at least a major portion of the period the interior of the sheet material is being cooled to a temperature below the flow temperature, the assembly being cooled and shrinkage of the vinyl film material from the edges of the heat resistant sheet material being reduced by passing a cooling fluid thereover having a temperature below normal room temperature.

20. In a method of applying vinyl film material to heat-resistant sheet material including the steps of applying under pressure the vinyl film material to a surface of the sheet material having cured adhesive thereon at an elevated temperature above the flow temperature of the adhesive and less than the temperature at which melting of the film occurs and thereafter cooling the assembly, the adhesive having a flow temperature above normal room temperature and the applied vinyl film material tending to shrink from the edges of the heat resistant sheet material when the assembly is cooled at normal room temperature, the improvement which comprises cooling at least the surface of the sheet material having vinyl film thereon and the adhesive to a temperature below the flow temperature of the adhesive over substantially the entire period the interior of the sheet material is being cooled to a temperature below the flow temperature of the adhesive material, the assembly being cooled and shrinkage of the vinyl film material from the edges of the heat resistant sheet material being reduced by passing a high velocity stream of refrigerated air having a temperature below normal room temperature over at least the surface of the sheet material having vinyl film material thereon.

References Cited in the file of this patent

UNITED STATES PATENTS

| | | |
|---|---|---|
| 2,070,600 | Jenett | Feb. 16, 1937 |
| 2,149,732 | Groff | Mar. 7, 1939 |
| 2,302,332 | Leekley | Nov. 17, 1942 |
| 2,412,528 | Morrell | Dec. 10, 1946 |
| 2,728,703 | Kiernan et al. | Dec. 27, 1955 |
| 2,861,022 | Lundsager | Nov. 18, 1958 |

UNITED STATES PATENT OFFICE
CERTIFICATE OF CORRECTION

Patent No. 3,053,725 September 11, 1962

Arthur E. Uhleen

It is hereby certified that error appears in the above numbered patent requiring correction and that the said Letters Patent should read as corrected below.

Column 4, line 65, after "as" insert -- to --; column 5, line 24, for "46", first occurrence, read -- 45 --; column 9, line 37, for "0.0008" read -- 0.008 --; column 11, line 55, for "stirp" read -- strip --.

Signed and sealed this 19th day of February 1963.

(SEAL)
Attest:

EASTON G. JOHNSON
Attesting Officer

DAVID L. LADD
Commissioner of Patents